Nov. 7, 1950 — G. CARLSON — 2,529,327
TIGHTENER FOR CLOTHESLINES
Filed Oct. 24, 1947
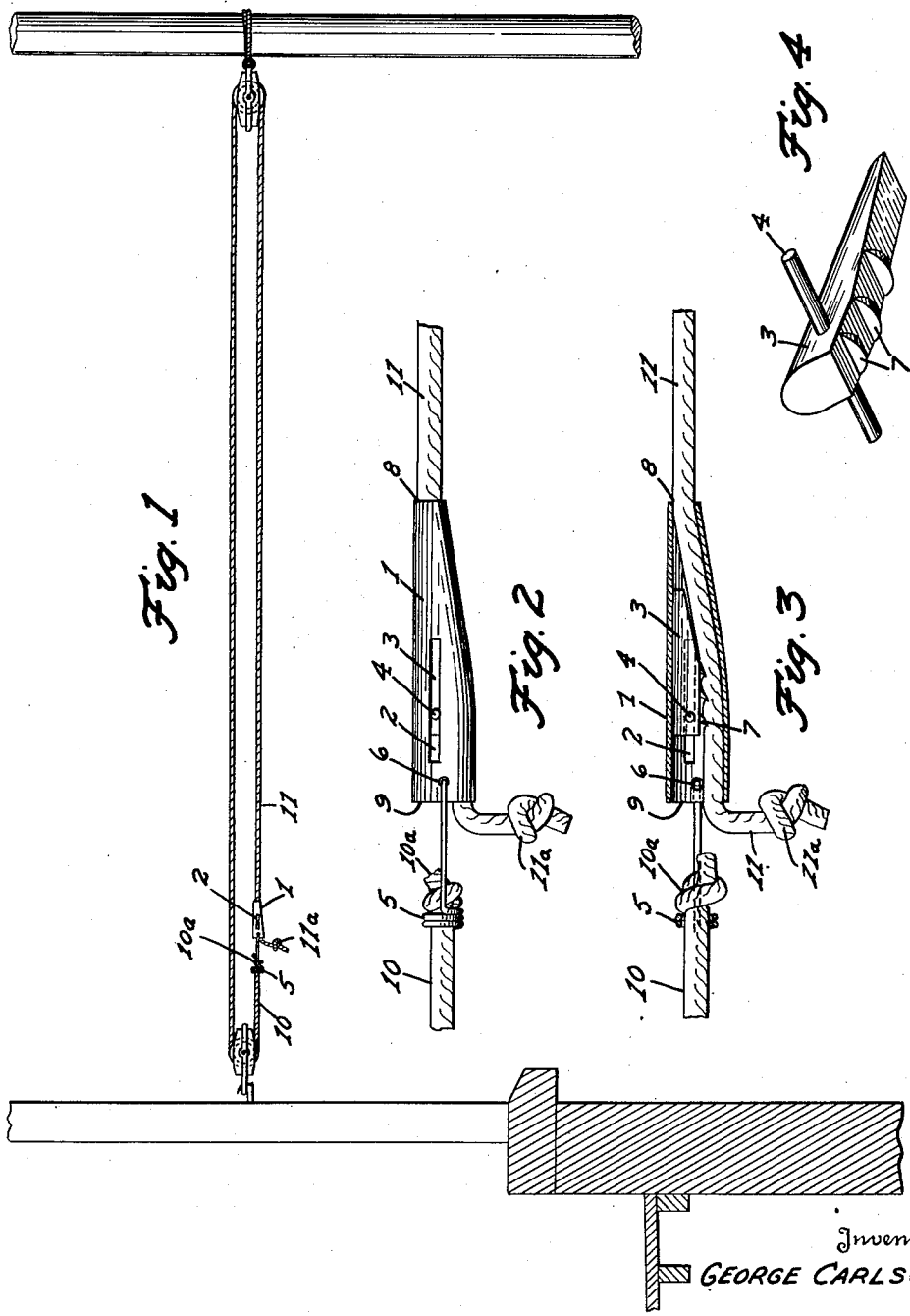
Inventor
GEORGE CARLSON
By Lester L. Sargent
Attorney Patented Nov. 7, 1950

2,529,327

UNITED STATES PATENT OFFICE 2,529,327

TIGHTENER FOR CLOTHESLINES

George Carlson, Brooklyn, N. Y.

Application October 24, 1947, Serial No. 781,933

1 Claim. (Cl. 24—126)

1

The object of my invention is to provide a novel but simple and effective tightener for clotheslines. I attain the objects of my invention by the device illustrated in the accompanying drawings in which:

Figure 1 is a side elevation of the invention applied to a clothesline;

Fig. 2 is a side elevation of the invention on an enlarged scale;

Fig. 3 is a detailed longitudinal sectional view of the device; and

Fig. 4 is a perspective view of the wedge element 3.

Like numerals designate like parts in each of the several views.

Referring to the accompanying drawing I provide a tubular housing or sleeve 1 having opposed longitudinal slots 2 adjacent one end thereof disposed in parallel relationship with respect to the axis of said sleeve. The opposite end of the sleeve has an internally tapered surface providing a reduced opening 8, the walls of the sleeve adjacent the slots 2 being substantially parallel and providing a larger opening 9. Longitudinally movable within the sleeve is a wedge member 3 provided with a guide rod 4 extending transversely therethrough. The extremities of this guide rod project through the opposed slots 2 and limit the range of movement of the wedge member. The forward portion of the bottom wall of the wedge member 3 is tapered complementarily to the tapered internal surface of the sleeve and the top wall and rear portion of the bottom wall of said wedge member are substantially parallel to the untapered portion of the sleeve. Arcuate projections 7 extend from the bottom wall of the wedge member and are adapted to engage with a clothesline 11 and as illustrated more particularly in Figure 3 of the drawing, it will be observed that such projections are located substantially on the parallel portion of the bottom wall of the wedge member. A wire or bail 5 is fastened to the end of a clothesline, this bail including a ring like portion through which the end 10 of the line is passed, the knot 10a formed thereafter in the line preventing separation. The inturned extremities 6 of the bail engage within suitable opposed apertures provided adjacent the large extremity 9 of the sleeve 1, as illustrated in Figures 2 and 3 of the drawings.

To use this device the end 10 of the clothesline

2 is slipped through bail 5 and tied into a single knot 10a. The other end 11 is passed through the smaller end 8 of the sleeve, coming between the serrated wedge 3 and the housing 1 and also tied into a knot 11a to prevent slipping back out. When the free end 11 is pulled back it also pulls back the wedge 3 which runs free in the housing 1, thereby bringing the line 11 up taut between the complementarily tapered surfaces of the wedge member 3 and the sleeve 1, and securely retained therebetween.

What I claim is:

A tightener for clotheslines comprising a sleeve having a tapered internal surface at one end and provided with opposed longitudinal slots adjacent the opposite untapered end thereof, a wedge member freely reciprocable within said sleeve, the forward portion of the bottom wall of said wedge member being longitudinally tapered complementarily to said tapered internal surface, the top wall and rear portion of the bottom wall of said wedge member being substantially parallel to the untapered portion of said sleeve, a transversely disposed guide rod extending through said wedge member, the extremities of said guide rod projecting through said opposed slots so that said wedge member may be moved into and out of engagement with a clothesline to be tightened, and a plurality of arcuate projections on the bottom wall of said wedge member, said projections being located substantially on the parallel portion of said wedge member and adapted to engage said clothesline immediately adjacent said tapered internal surface, forward movement of the wedge member securing the clothesline between the complementarily tapered surfaces of said wedge member and said sleeve.

GEORGE CARLSON.

REFERENCES CITED

The following references are of record in the file of this patent:

UNITED STATES PATENTS

| Number | Name | Date |
|---|---|---|
| 805,275 | Fisher | Nov. 21, 1905 |
| 1,393,107 | Fuller | Oct. 11, 1921 |
| 1,628,235 | De Meo | May 10, 1927 |
| 1,832,138 | Pounder | Nov. 17, 1931 |
| 1,832,388 | Heisser | Nov. 17, 1931 |